United States Patent Office.

THOMAS J. CHUBB, OF WILLIAMSBURG, NEW YORK.

Letters Patent No. 90,926, dated June 8, 1869.

IMPROVED PROCESS OF MAKING CAST-STEEL.

The Schedule referred to in these Letters Patent and making part of the same.

*To all whom it may concern:*

Be it known that I, THOMAS J. CHUBB, of Williamsburg, Kings county, State of New York, have invented new Improvements in Process of Making Cast-Steel; and I do hereby declare that the following is a full and exact description thereof.

The nature of my improvement and invention consists in reducing the quantity of carbon in contact with crude cast-iron, and other carburets of iron, and refining and converting it direct into cast-steel, by means of submerging natured iron, or pieces of wrought-iron, into a bath, or mass of the molten cast-iron, in a stationary vessel, chamber, or chambers, in a furnace heated by air and gas which has been previously heated or reheated before combustion.

Also, in the conversion of old or new wrought or malleable iron, such as old railroad-rails, and other scrap-iron, directly into cast-steel, in a large way, or in a large stationary or fixed vessel, chamber, or chambers in a furnace, the iron being heated, fused, and refined by aid of gas and air that have been either heated, reheated, or superheated, previous to being ignited in the combustion-chamber, and in direct or in near contact with the metal.

Also in reducing the carbon in crude cast-iron or similar carburetted metal by introducing, submerging, or stirring into a bath, or mass of the molten carburetted metal, a quantity of sand or finely-pulverized iron-ore in the form of sand or partly-natured iron-ore, in the form of sand or otherwise, and reducing, melting, refining, and converting the metal in the ore and the metal in the bath into cast-steel, by aid of gas and air previously heated or reheated, before ignition in the combustion-chamber, and in direct or near contact with the ore and the metal.

By aid of the process of generating gas in one furnace or apparatus, and reheating such gas and heating air to a high degree in other furnaces or apparatus, previous to the gas and air being brought in contact with each other, or previous to igniting the two, I am enabled to heat and fuse the metals, without burning or materially injuring them, whereby the product, after being refined, may be discharged from the furnace in the proper consistency of cast-steel.

To enable others skilled in the arts to use my improvements and invention, I will proceed to describe the

Mode of Operation.

I construct an ordinary arched-top furnace, or preferably such a furnace as is described in my patents of 1868 and 1867, or similar to the one described in the specifications of another and separate application filed herewith, although I do not confine my improvements to any specific arrangement of furnace, but I arrange in a furnace a stationary fixed vessel, or a chamber, or chambers, in such a manner that they may be heated, and the metal therein may be heated, melted, or refined, by aid of highly-heated air, and heated or reheated gas or gases.

I introduce the crude cast-iron, or carburetted iron, or iron containing a surplus of carbon, into the melting-vessel, or chamber, and apply sufficient heated gas and heated air to produce an intense heat, or sufficient heat to the cast-iron, not only to melt it, but that it may impart sufficient heat to the ore, wrought or natured iron, as to melt it also. I introduce sufficient of the ore, natured or wrought-iron, to reduce the quantity of carbon in the cast-iron by conveying it to the ore, natured or wrought-iron, whereby the whole of the metal in the furnace, vessel, or chamber, is converted into cast-steel.

I also refine the metal, either before or after the carbon is sufficiently reduced, and I sometimes burn out a part of the carbon by turning on a surplus of heated air, or more than sufficient to ignite the heated gas, and I sometimes employ such chemicals as may be required to assist in the refining-process.

When all the metal in the refining-vessel, or chamber, is converted, reduced, and refined to the consistency of cast-steel, I tap or discharge the contents from the furnace and cast into moulds.

I claim—

1. Reducing crude cast or other carburetted iron into cast-steel, by means substantially as described.

2. Submerging natured, malleable, or wrought-iron into a bath of cast-iron, or into a mass of molten carburet of iron, and converting and refining the same into cast-steel, substantially as described.

3. Submerging natured iron-ore, or partly-natured iron-ore, into a bath of cast-iron or other molten carburet of iron, and reducing, refining, and converting the mass into cast-steel, by means substantially as described.

4. Heating air and heating gas, or reheating gas, previously to ignition or combustion, and employing them in the process of making steel, substantially as described.

THOS. J. CHUBB.

Witnesses:
JACOB REPPERT,
JOHN STEWART.